United States Patent
Katayama et al.

(10) Patent No.: US 12,392,399 B2
(45) Date of Patent: Aug. 19, 2025

(54) VEHICLE DRIVE DEVICE WITH AN AXIAL OIL GUIDE PASSAGE

(71) Applicant: AISIN CORPORATION, Kariya (JP)

(72) Inventors: Takatoshi Katayama, Kariya (JP); Nozomu Takahashi, Kariya (JP); Takayoshi Hanai, Kariya (JP); Teppei Yamashita, Kariya (JP); Hiroaki Sanji, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/694,296

(22) PCT Filed: Sep. 27, 2022

(86) PCT No.: PCT/JP2022/035924
§ 371 (c)(1),
(2) Date: Mar. 21, 2024

(87) PCT Pub. No.: WO2023/054351
PCT Pub. Date: Apr. 6, 2023

(65) Prior Publication Data
US 2024/0401679 A1 Dec. 5, 2024

(30) Foreign Application Priority Data
Sep. 28, 2021 (JP) .................. 2021-158219

(51) Int. Cl.
*F16H 57/04* (2010.01)
*F16H 37/08* (2006.01)
(Continued)

(52) U.S. Cl.
CPC ....... *F16H 37/0813* (2013.01); *F16H 57/037* (2013.01); *F16H 57/0423* (2013.01);
(Continued)

(58) Field of Classification Search
CPC ............... F16H 37/0813; F16H 57/037; F16H 57/0423; F16H 57/0441; F16H 57/045;
(Continued)

(56) References Cited

U.S. PATENT DOCUMENTS 8,720,660 B2 * 5/2014 Kimura .................. B60T 1/005
192/219.5
8,840,511 B2 * 9/2014 Seno .................. F16H 57/0423
184/6.12
(Continued)

FOREIGN PATENT DOCUMENTS

| JP | 2021-008902 A | 1/2021 |
| WO | 2019/098166 A1 | 5/2019 |
| WO | 2021/095379 A1 | 5/2021 |

OTHER PUBLICATIONS

Dec. 20, 2022 International Search Report issued in International Patent Application No. PCT/JP2022/035924.

*Primary Examiner* — Edwin A Young
(74) *Attorney, Agent, or Firm* — Oliff PLC

(57) ABSTRACT

A vehicle drive device includes an axial oil guide passage that receives oil splashed by a differential input gear and dropping from a meshing portion between the differential input gear and a second counter gear and guides the oil in an axial direction along a third axis to a tooth surface of a first counter gear.

9 Claims, 9 Drawing Sheets

(51) Int. Cl.
  *F16H 57/037*  (2012.01)
  *F16H 57/02*  (2012.01)

(52) U.S. Cl.
  CPC ....... *F16H 57/0441* (2013.01); *F16H 57/045* (2013.01); *F16H 57/0457* (2013.01); *F16H 57/0476* (2013.01); *F16H 57/0483* (2013.01); *F16H 2057/02034* (2013.01); *F16H 2057/02052* (2013.01)

(58) Field of Classification Search
  CPC ............. F16H 57/0457; F16H 57/0476; F16H 57/0483; F16H 2057/02034; F16H 2057/02052
  USPC ......................................................... 475/150
  See application file for complete search history.

(56) References Cited

U.S. PATENT DOCUMENTS

| | | | |
|---|---|---|---|
| 9,103,432 B2* | 8/2015 | Isomura | ............... F16H 57/0427 |
| 11,015,700 B2* | 5/2021 | Yageta | ............... F16H 57/0471 |
| 11,898,630 B2 | 2/2024 | Inoue | |
| 2009/0114462 A1* | 5/2009 | Tahara | ................... H02K 7/116 |
| | | | 903/952 |
| 2010/0083792 A1* | 4/2010 | Ariga | ................... F16H 57/037 |
| | | | 74/606 R |
| 2011/0041649 A1* | 2/2011 | Iwata | ................. F16H 57/0447 |
| | | | 74/606 R |
| 2011/0245009 A1* | 10/2011 | Shibayama | ......... F16H 57/0457 |
| | | | 475/160 |
| 2011/0263372 A1* | 10/2011 | Kimura | ............... F16H 57/0483 |
| | | | 475/160 |
| 2012/0096968 A1* | 4/2012 | Kawamoto | ......... F16H 57/0423 |
| | | | 74/467 |
| 2012/0286607 A1* | 11/2012 | Shimizu | ............. F16H 57/0471 |
| | | | 310/90 |
| 2013/0192400 A1* | 8/2013 | Dodo | .................... F16H 37/082 |
| | | | 74/421 A |
| 2014/0155214 A1* | 6/2014 | Kimura | ................. F16H 57/045 |
| | | | 475/160 |
| 2022/0316582 A1 | 10/2022 | Inoue | |

* cited by examiner

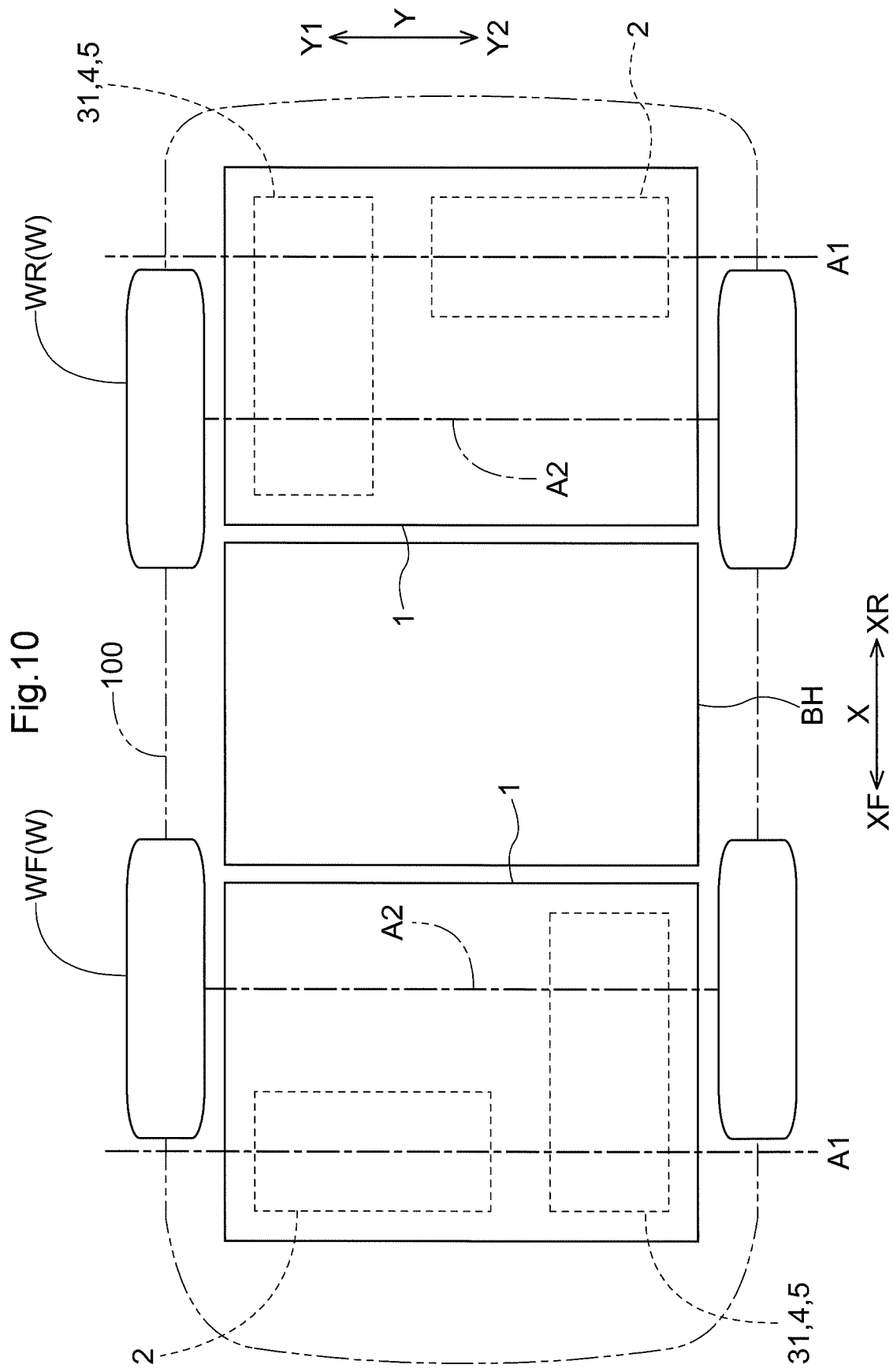

VEHICLE DRIVE DEVICE WITH AN AXIAL OIL GUIDE PASSAGE

FIELD

The present disclosure relates to a vehicle drive device including a rotary electric machine, a counter gear assembly, a differential gear assembly, and a case accommodating these components.

BACKGROUND

Japanese Unexamined Patent Application Publication No. 2021-8902 describes a vehicle drive device including a gear to splash oil to a target area in which an object for lubrication is located. The vehicle drive device includes a rotary electric machine, a counter gear assembly, and a differential gear assembly that are on different axes parallel to one another, a case accommodating these components, and an oil reservoir for storing oil in the case. A counter gear in the counter gear assembly (a counter driven gear to mesh with a gear in the rotary electric machine) has a bottom immersed in oil stored in the oil reservoir. The counter gear splashes a portion of oil into a catch tank as a temporary oil reservoir when the vehicle moves forward. Oil stored in the catch tank is then supplied to the target area described above. When the vehicle moves backward, the counter gear rotates in the reverse direction and thus cannot splash oil appropriately to the catch tank. Thus, a ring gear in the differential gear assembly (a differential input gear to mesh with a counter drive gear in the counter gear assembly), which is also partly immersed in the oil reservoir in the same manner as the counter gear, splashes a portion of the oil to the catch tank.

CITATION LIST

Patent Literature

Patent Literature 1: Japanese Unexamined Patent Application Publication No. 2021-8902

BRIEF SUMMARY

Technical Problem

The vehicle drive device described above can supply oil splashed by either gear to the catch tank and then supply oil stored in the catch tank to the target area both when the vehicle moves forward and when the vehicle moves backward. However, different gears are used for splashing oil when the vehicle moves forward and when the vehicle moves backward. The gears are both to have their bottoms located below the oil level in an oil reservoir. The viscous resistance of the oil tends to have more loss in the counter gear assembly and the differential gear assembly.

In response to the above circumstances, a vehicle drive device is to supply lubricant oil to an object for lubrication by splashing oil appropriately through rotation of gears with less loss in the gear assembly caused by the viscous resistance of the oil.

Solution to Problem

In response to the above, a vehicle drive device includes a rotary electric machine including a rotor, a differential gear assembly that distributes a driving force transmitted to a differential input gear to a pair of wheels, a counter gear assembly that transmits the driving force between the rotor and the differential input gear, and a case accommodating the rotary electric machine, the differential gear assembly, and the counter gear assembly. The rotor is located on a first axis. A rotor output gear rotatable integrally with the rotor is located on the first axis. The differential gear assembly is located on a second axis parallel to and different from the first axis. The counter gear assembly is located on a third axis parallel to and different from the first axis and the second axis and includes a first counter gear meshing with the rotor output gear and a second counter gear rotatable integrally with the first counter gear and meshing with the differential input gear. The vehicle drive device further includes an axial oil guide passage that receives oil splashed by the differential input gear and dropping from a meshing portion between the differential input gear and the second counter gear and guides the oil in an axial direction along the third axis to a tooth surface of the first counter gear.

In this structure, the axial oil guide passage can receive oil dropping from the meshing portion between the differential input gear, which splashes oil, and the second counter gear, which meshes with the differential input gear, and can guide the oil to the tooth surface of the first counter gear. This allows the first counter gear to splash oil when the first counter gear has no part immersed in the oil. In this manner, the vehicle drive device with this structure can supply lubricant oil to an object for lubrication by splashing oil appropriately through rotation of gears with less loss in the gear assembly caused by the viscous resistance of the oil.

Further aspects and features of the vehicle drive device will be apparent from exemplary and nonlimiting embodiments described below with reference to the drawings.

BRIEF DESCRIPTION OF DRAWINGS

FIG. 10 is a schematic plan view of an example vehicle incorporating the vehicle drive devices mounted respectively for front wheels and for rear wheels.

DETAILED DESCRIPTION

A vehicle drive device according to an embodiment will now be described with reference to the drawings. A direction used in describing each component herein refers to a direction in a vehicle drive device 1 mounted on a vehicle 100 (refer to FIG. 9) (in an in-vehicle state). The terms associated with the dimensions, orientation, arrangement position, and other aspects of each component may have tolerances resulting from variations (variations allowable in manufacture). In the in-vehicle state, the direction along the rotation axis of the vehicle drive device 1 (in the present embodiment, separate axes parallel to each other, such as a first axis A1, a second axis A2, and a third axis A3 described in detail later) is referred to as an axial direction L. One direction along the axis in the axial direction L is referred to as a first axial direction L1, and the opposite direction is referred to as a second axial direction L2. The directions perpendicular to the axes are referred to as radial directions of the axes. The direction perpendicular to the vehicle drive device 1 mounted on the vehicle 100 is referred to as a vertical direction Z, in which a more upward position is referred to as a higher position Z1 and a more downward position is referred to as a lower position Z2. When the vehicle drive device 1 is mounted on the vehicle 100 with the axial direction L parallel to the horizontal plane, one of the radial directions matches the vertical direction Z. The direction perpendicular to the vertical direction Z and to the axial direction L is referred to as a width direction H. One direction along the axis in the width direction H is referred to as a first width direction H1, and the opposite direction is referred to as a second width direction H2.

The direction from rear wheels WR toward front wheels WF along the axis in a vehicle front-rear direction X (refer to FIG. 9) is referred to as a front direction XF, and the opposite direction is referred to as a rear direction XR. The direction perpendicular to the vehicle front-rear direction X when viewed in the vertical direction Z is referred to as a vehicle width direction Y. In the present embodiment, the vehicle width direction Y matches the axial direction L (refer to FIGS. 1 and 9).

Figure 1:
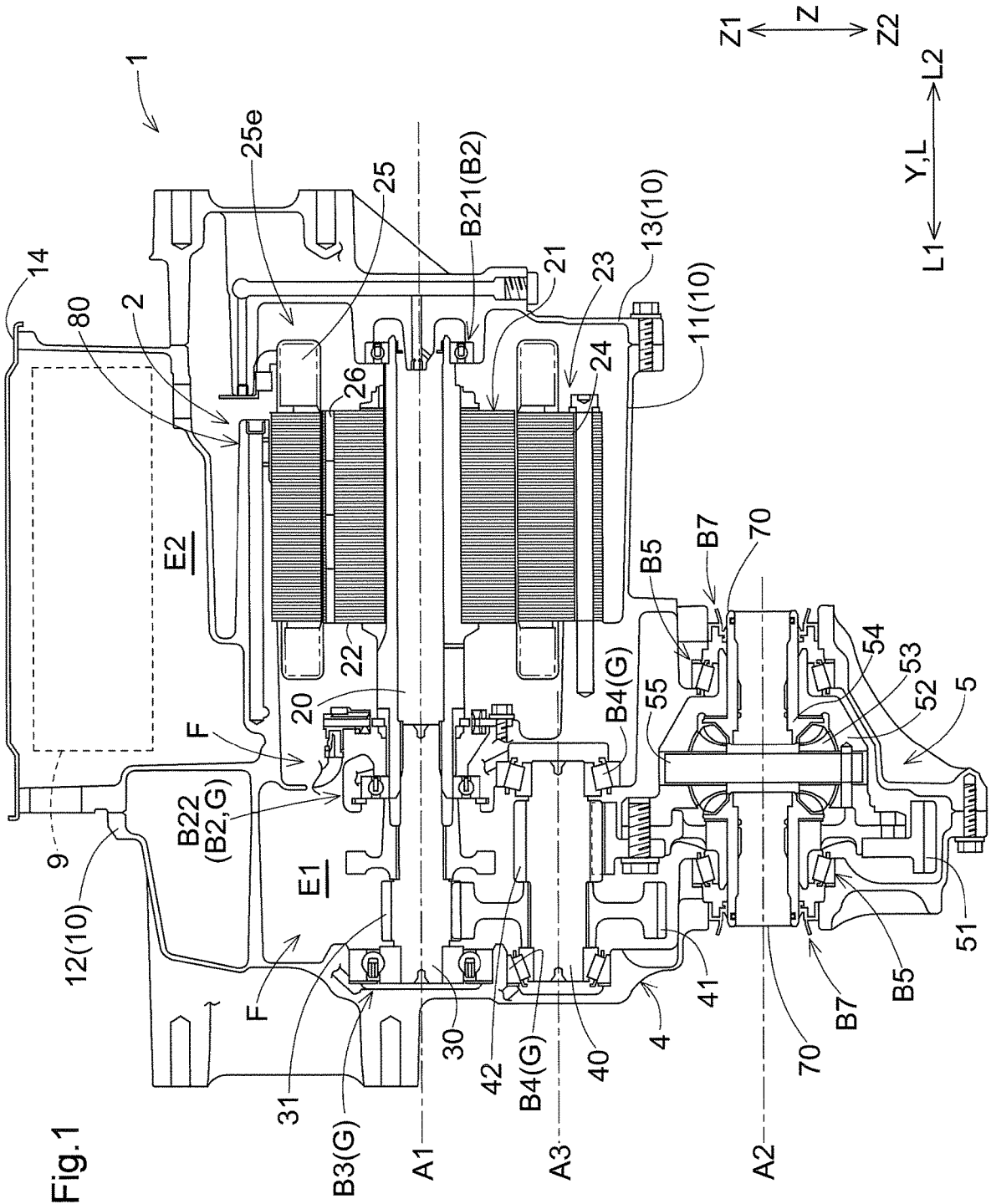
FIG. 1 is a cross-sectional view of a vehicle drive device in an axial direction, showing its example basic structure.
Figure 2:
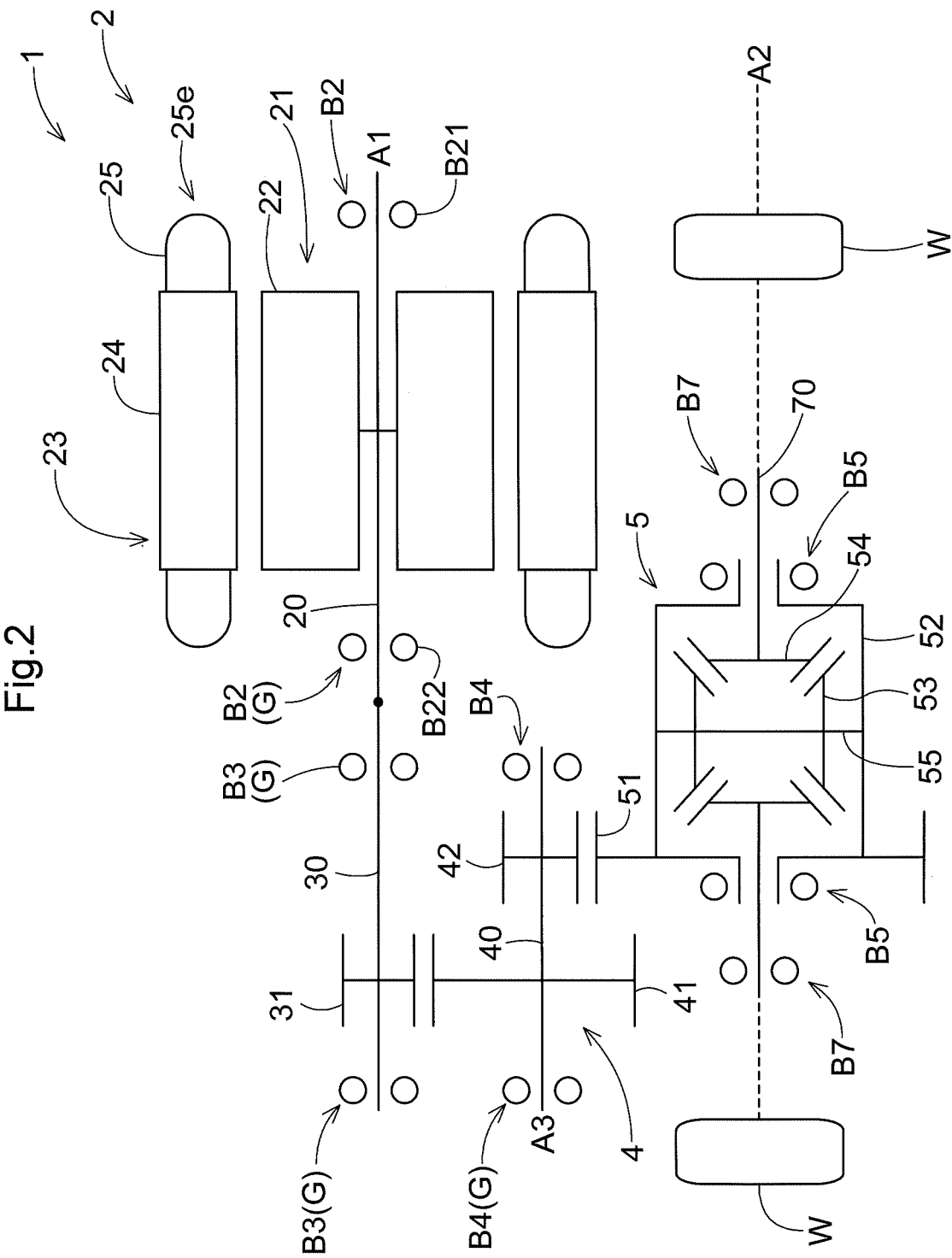
FIG. 2 is a skeleton diagram of the vehicle drive device, showing its example basic structure.

As shown in FIGS. 1 and 2, the vehicle drive device 1 includes a rotary electric machine 2 including a rotor 21, a differential gear assembly 5 that distributes a driving force transmitted to a differential input gear 51 to a pair of wheels W, a counter gear assembly 4 that transmits the driving force between the rotor 21 and the differential input gear 51, and a case 10 accommodating the rotary electric machine 2, the differential gear assembly 5, and the counter gear assembly 4. The case 10 includes a case body 11, a first cover 12 joined to the case body 11 from a position in the first axial direction L1, a second cover 13 joined to the case body 11 from a position in the second axial direction L2, and a third cover 14 joined to the case body 11 from a higher position Z1. The case body 11 is divided in the vertical direction Z by a partition wall (not shown), defining a device chamber E1 at a lower position Z2 for accommodating the rotary electric machine 2, the differential gear assembly 5, and the counter gear assembly 4. In other words, the device chamber E1 is a space defined by the partition wall, the inner wall of the case body 11 below the partition wall, the first cover 12, and the second cover 13. The space above the partition wall, or in other words, a space defined by the partition wall, the inner wall of the case body 11 below the partition wall, and the third cover 14 includes an inverter chamber E2 accommodating an inverter 9 (described later).

The rotor 21 is located on the first axis A1. A rotor output gear 31 that rotates integrally with the rotor 21 is also located on the first axis A1. The differential gear assembly 5 is located on the second axis A2 parallel to and different from the first axis A1. The counter gear assembly 4 is located on the third axis A3 parallel to and different from the first axis A1 and the second axis A2. The counter gear assembly 4 includes a first counter gear 41 that meshes with the rotor output gear 31 and a second counter gear 42 that rotates integrally with the first counter gear 41 and meshes with the differential input gear 51.

The rotary electric machine 2 is a rotary electric machine (a motor or a generator) that operates with, for example, a polyphase (e.g., three-phase) alternating current (AC), and can function as a motor or a generator. The rotary electric machine 2 is powered by power from a direct current (DC) power supply, or supplies (regenerates) power generated with an inertial force of the vehicle 100 to the DC power supply. The rotary electric machine 2 is driven and controlled by the inverter 9 including an inverter circuit (not shown) that converts DC power and polyphase AC power. In the present embodiment, as shown in FIG. 1, the inverter 9 is also accommodated in the case 10. The case 10 defines, separately from the device chamber E1, an inverter chamber E2 for accommodating the inverter 9.

The inverter circuit includes multiple switching devices. For example, the inverter circuit and a freewheel diode are integral as a single power module. A DC link capacitor (not shown) as a smoothing capacitor is located at the DC end of the inverter circuit PM to smooth the voltage (DC link voltage) between positive and negative electrodes. The inverter circuit is controlled by an inverter controller (not shown). The inverter 9 is unitized with the above inverter controller, the DC link capacitor, and the inverter circuit (power module). The inverter 9 is located in the inverter chamber E2 in the case 10, and is fastened to the case 10 with a fastener such as a bolt.

Figure 3:
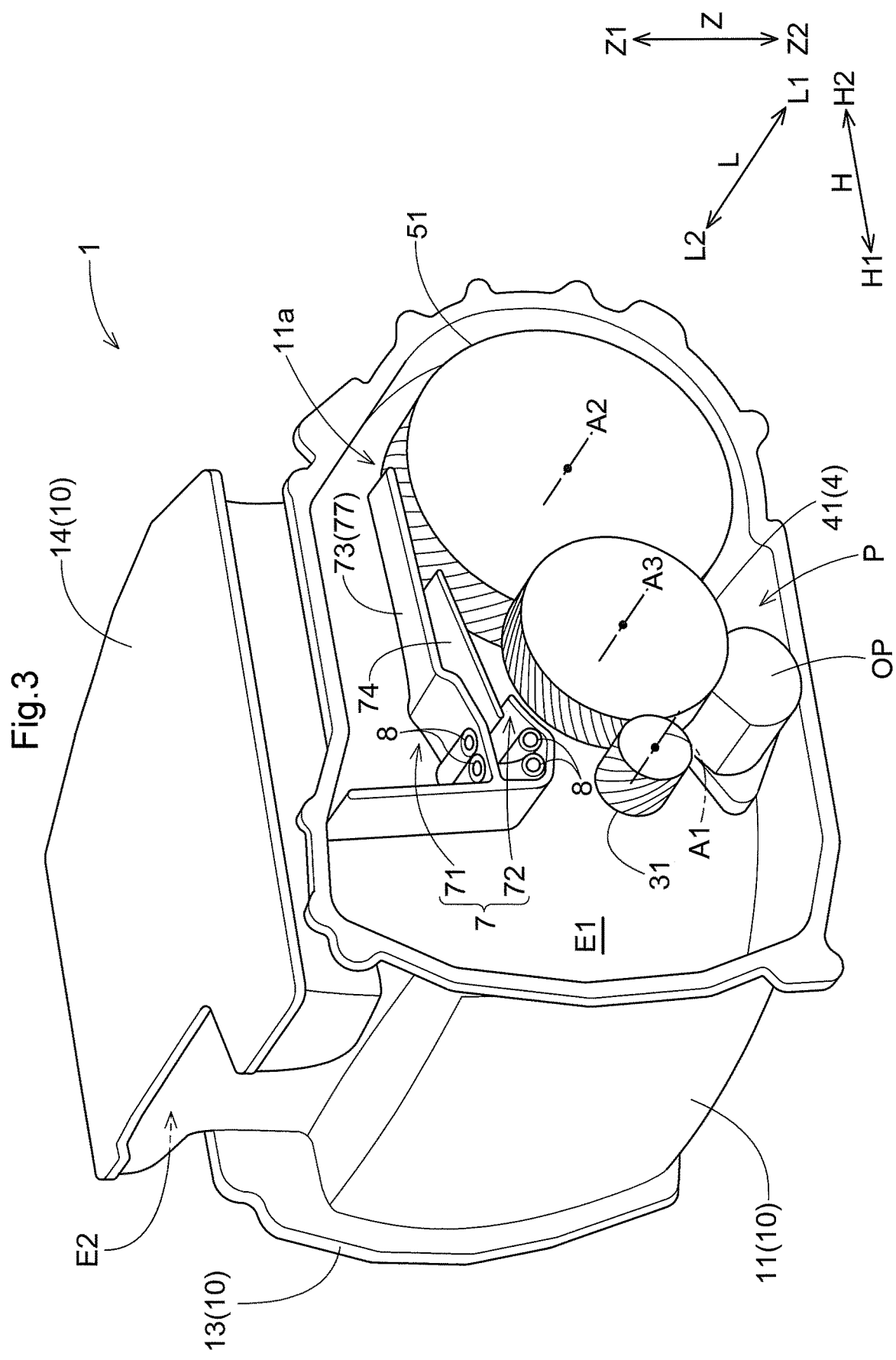
FIG. 3 is a schematic perspective view of the vehicle drive device with a first cover removed.
Figure 4:
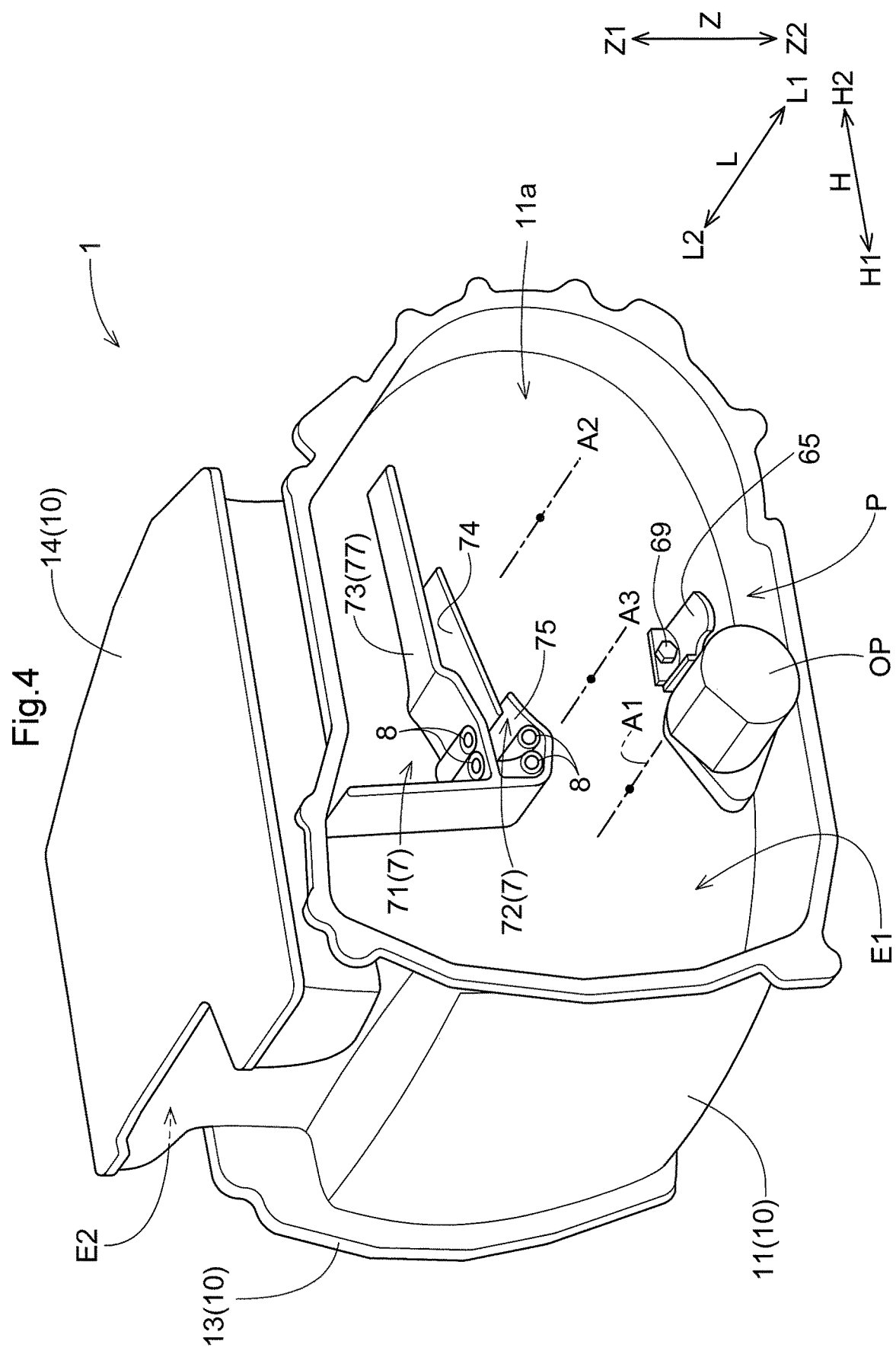
FIG. 4 is a schematic perspective view of the vehicle drive device with the first cover and a gear removed.

In the present embodiment, as shown in, for example, FIGS. 1, 3, and 4, the device chamber E1 and the inverter chamber E2 are integral with each other. In other words, the case 10 includes an integral body (case body 11) defining the device chamber E1 accommodating the components such as the rotary electric machine 2 and the inverter chamber E2 accommodating the inverter 9. Being integral indicates an integrated component formed from the same material as, for example, a die casting. The device chamber E1 and the inverter chamber E2 may be formed from different materials and may be fastened together into a single case 10.

The rotary electric machine 2 includes a stator 23 fixed to, for example, the case 10, and the rotor 21 supported radially inward from the stator 23 in a rotatable manner. In the present embodiment, the stator 23 includes a stator core 24 and a stator coil 25 wound around the stator core 24. The rotor 21 includes a rotor core 22 and permanent magnets 26 located on the rotor core 22. The stator coil 25 is wound around the stator core 24. The stator 23 has, at its ends in the axial direction L, coil ends 25e as bends of the wound stator coil 25 protruding from the stator core 24 in the axial direction L.

The rotor 21 in the rotary electric machine 2 is connected to a rotor shaft 20 that rotates integrally with the rotor 21. A rotor connecting shaft 30 is connected to the rotor shaft 20 to rotate integrally with the rotor shaft 20. The rotor shaft 20 is rotatably supported on the case 10 with a rotor bearing B2. The rotor connecting shaft 30 is rotatably supported on the case 10 with an input bearing B3. The rotor output gear 31 is located on the rotor connecting shaft 30 to rotate integrally with the rotor connecting shaft 30.

The rotor shaft 20 in the rotary electric machine 2 is supported, with a first rotor bearing B21, on the end of the rotor 21 opposite from the rotor connecting shaft 30 (rotor output gear 31) in the axial direction L (second axial direction L2), and supported, with a second rotor bearing B22, on the end of the rotor 21 adjacent to the rotor connecting shaft 30 (rotor output gear 31) in the axial direction L (first axial direction L1). As described later, the rotor output gear 31 meshes with the first counter gear 41 in the counter gear assembly 4.

The differential gear assembly 5 is located on the second axis A2 and distributes a driving force transmitted from the rotary electric machine 2 to the pair of wheels W. In the present embodiment, the differential gear assembly 5 includes multiple bevel gears (pinion gears 53 and differential output gears 54) that mesh with one another and a differential case 52 accommodating the multiple bevel gears. The differential case 52 is rotatably supported on the case 10 with differential bearings B5. The differential case 52 is connected to the differential input gear 51 to rotate integrally with the differential input gear 51, and also supports a pinion shaft 55. The differential gear assembly 5 transmits the rotation and torque input into the differential input gear 51 from the rotary electric machine 2 to the pinion shaft 55 extending in the radial direction of the second axis A2 and rotating integrally with the differential input gear 51, and distributes and transmits the rotation and torque to a pair of output members 70 through the pair of differential output gears 54 meshing with the pinion gears 53 rotatably supported on the pinion shaft 55. The output members 70 are rotatably supported on the case 10 with output bearings B7.

The counter gear assembly 4 located on the third axis A3 drives and connects the rotary electric machine 2 and the differential gear assembly 5 (differential input gear 51) with the rotor output gear 31. A counter connecting shaft 40 is rotatably supported on the case 10 with counter bearings B4. In the present embodiment, the counter gear assembly 4 includes the first counter gear 41 and the second counter gear 42 connected to each other with the counter connecting shaft 40. The first counter gear 41 meshes with the rotor output gear 31. The second counter gear 42 connected to the first counter gear 41 with the counter connecting shaft 40 meshes with the differential input gear 51. The counter connecting shaft 40 is rotatably supported on the case 10 with the pair of counter bearings B4 located outward in the axial direction L from the first counter gear 41 and the second counter gear 42.

The rotary electric machine 2, the rotor output gear 31, the counter gear assembly 4, the differential gear assembly 5, and the bearings supporting these components are lubricated and cooled using oil in a reservoir in the case 10. As described above, the stator 23 has, at its ends in the axial direction L, the coil ends 25e as bends of the wound stator coil 25 protruding from the stator core 24 in the axial direction L. For example, the stator coil 25 is cooled with oil as a refrigerant applied to the coil ends 25e.

Figure 5:
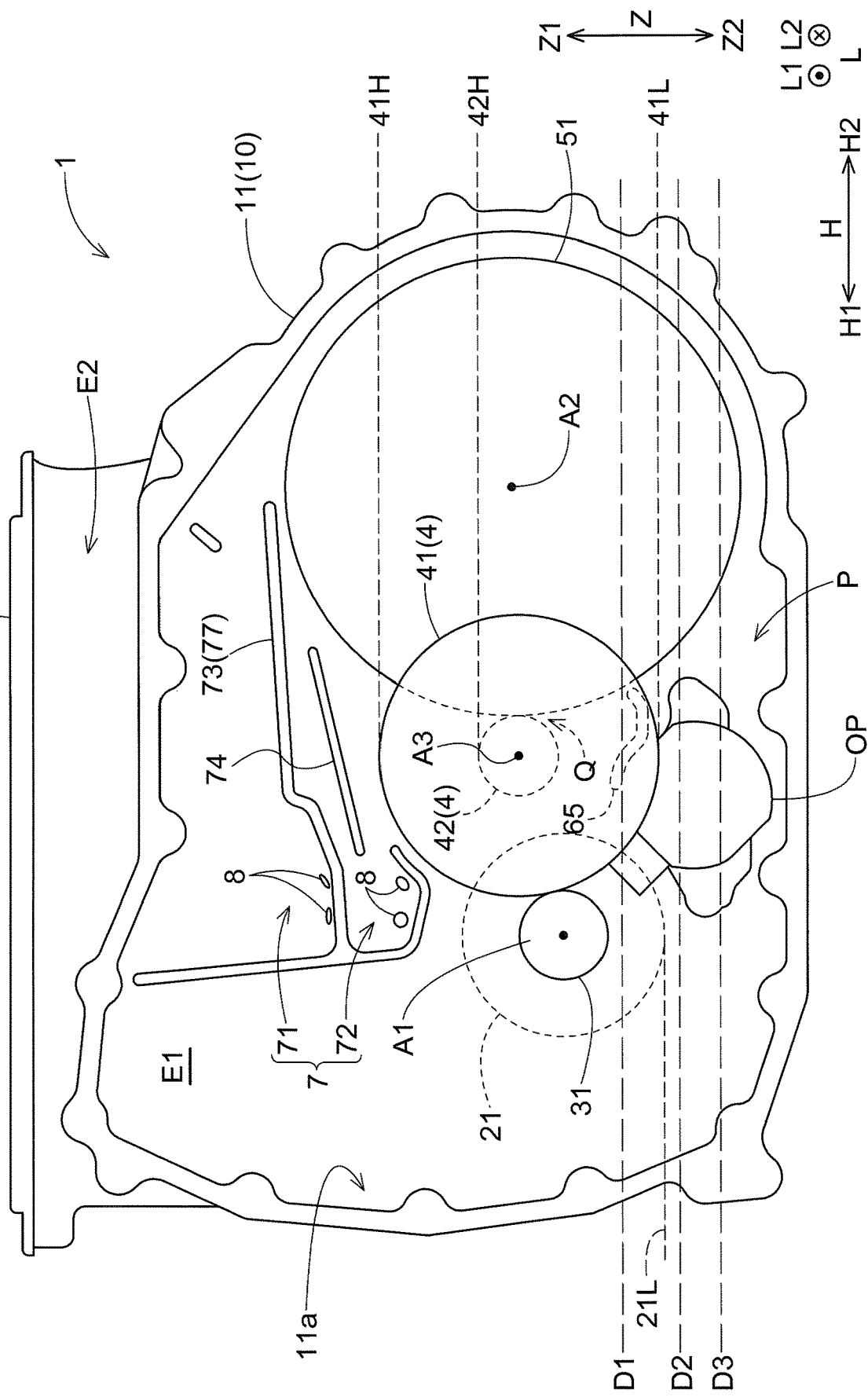
FIG. 5 is a schematic side view of the vehicle drive device with the first cover removed, when viewed from a position corresponding to the first cover (viewed from a position in the first axial direction).

The case 10 includes, specifically in a lower portion of the device chamber E1, an oil reservoir P (refer to FIGS. 3 to 5) to store oil dropping after being used for lubrication and cooling. In other words, the case 10 includes the oil reservoir P in its lower portion to store oil. The vehicle drive device 1 according to the present embodiment includes an oil pump OP in the case 10 to suck and discharge oil stored in the oil reservoir P and supply oil to at least the rotary electric machine 2. As described in detail later, as shown in FIGS. 3 and 5, the oil pump OP is at a lower position Z2 than the counter gear assembly 4 and at least partially overlaps the counter gear assembly 4 when viewed vertically. The oil pump OP sucks oil from the oil reservoir P and discharges oil into an oil passage to supply the oil to a destination.

The counter gear assembly 4, which drives and connects the rotor 21 in the rotary electric machine 2 and the differential input gear 51, can be arranged with higher degrees of freedom than the rotor 21 and the differential input gear 51, which are arranged based on the positions of the rotary electric machine 2 and the wheels W. The counter gear assembly 4 can thus more easily have a space at the lower position Z2 for the oil pump OP for efficient use of the space in the case 10. The oil pump OP at a lower position in the case 10 can easily pump oil stored in a lower portion of the case 10 under gravity. As described in detail later, the counter gear assembly (first counter gear 41) in the present embodiment may not be used to splash oil stored in the oil reservoir P. In other words, the first counter gear 41 may have no part immersed in the oil reservoir P. The counter gear assembly 4 may thus be at a relatively upper position in the case 10. This structure can easily have a space for accommodating the oil pump OP below the case 10 having the oil reservoir P, or for example, below the counter gear assembly 4.

The rotary electric machine 2, the rotor output gear 31, the counter gear assembly 4, the differential gear assembly 5, and some of the bearings that support these components also receive oil splashed by the gears accommodated in the case 10. Oil stored in the oil reservoir P is splashed by the gear (e.g., the differential input gear 51) included in the vehicle drive device 1. The splashed oil is directly supplied to lubrication target portions (target portion G) such as bearings and is stored into a catch tank 7 (refer to FIGS. 3 to 6) located in the case 10. The stored oil is then supplied to the target portion G through the catch tank 7. A space with the target portion G in the case 10 is hereafter referred to as a target space F.

The vehicle drive device 1 according to the present embodiment includes the catch tank 7 that stores oil splashed by the gear and supplies oil to the target space F including the target portion G to which the oil is supplied. As shown in FIGS. 3 to 6, the catch tank 7 includes a first catch tank 71 and a second catch tank 72 aligned in the vertical direction Z and at least partially overlapping each other when viewed vertically. The second catch tank 72 is at a lower position Z2 than the first catch tank 71. More specifically, the first catch tank 71 stores oil splashed by the differential input gear 51 when the rotor 21 rotates in a first rotation direction V1 (refer to FIG. 7), and stores oil splashed by the first counter gear 41 when the rotor 21 rotates in a second rotation direction V2 (refer to FIG. 8) reverse to the first rotation direction V1. The second catch tank 72 stores oil splashed by the first counter gear 41 when the rotor 21 rotates in the second rotation direction V2.

In the present embodiment, as shown in FIG. 5, the second catch tank 72 is located lower than an end of the first counter gear 41 at a higher position Z1 in the vertical direction Z (first counter gear upper end 41H). This structure allows the first counter gear 41 to splash and appropriately guide oil into the second catch tank 72 as described in detail later. The second catch tank 72 is located higher than an end of the second counter gear 42 at a higher position Z1 in the vertical direction Z (second counter gear upper end 42H). In the present embodiment, the first catch tank 71 has a larger capacity than the second catch tank 72.

The first catch tank 71 and the second catch tank 72 are continuous with each other to supply oil stored in the first catch tank 71 through an orifice 8 to the second catch tank 72. Oil stored in the first catch tank 71 and the second catch tank 72 is supplied to the target space F through the orifice 8. The first catch tank 71 may be continuous with the second catch tank 72 alone or with the target space F alone. The first catch tank 71 may be continuous with both the second catch tank 72 and the target space F. When the second catch tank 72 is continuous with the target space F, and the first catch tank 71 is continuous with the second catch tank 72, the first catch tank 71 and the target space F are continuous through the second catch tank 72. More specifically, the first catch tank 71 is continuous with at least one of the second catch tank 72 or the target space F through the orifice 8.

The orifice 8 allows supply of oil at a restricted flow rate. Oil can be supplied continuously from the first catch tank 71 through the second catch tank 72 to the target space F, without a sudden decrease in the oil stored in the first catch tank 71.

Figure 6:
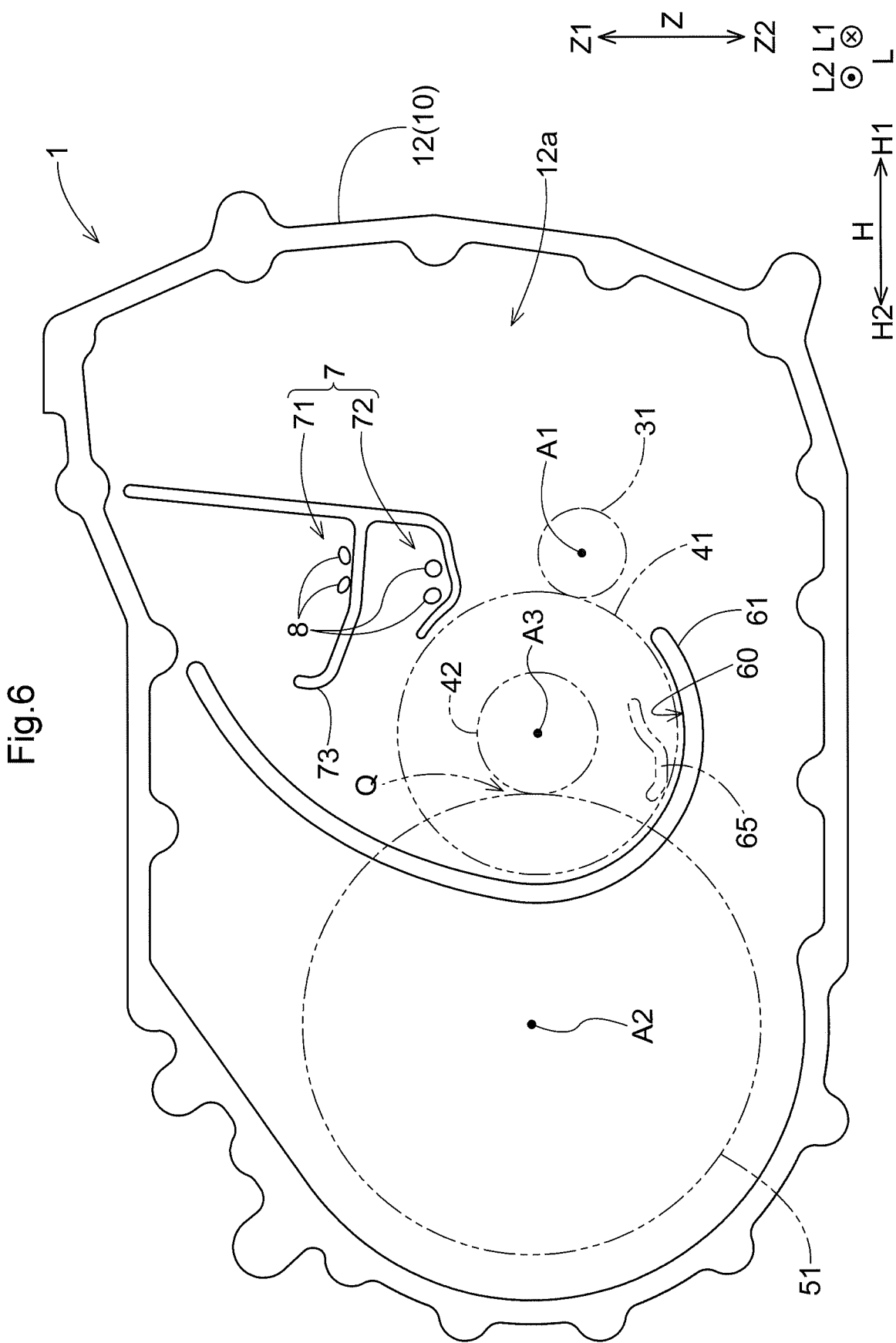
FIG. 6 is a schematic side view of the first cover, when viewed from a position in a second axial direction.

As shown in FIGS. 3 to 5, the first catch tank 71 and the second catch tank 72 protrude in the axial direction L (first axial direction L1) from the wall surface (first wall surface 11a) of the case 10 (case body 11) extending in the vertical direction Z. As shown in FIG. 6, the first catch tank 71 and the second catch tank 72 protrude in the axial direction L (second axial direction L2) from the wall surface (second wall surface 12a) of the case 10 (first cover 12) extending in the vertical direction Z. As shown in FIG. 1, the case body 11 and the first cover 12 are joined to each other in the axial direction L to form the case 10. A portion of the case body 11 protruding in the first axial direction L1 and a portion of the first cover 12 protruding in the first axial direction L1 are joined to each other to form the first catch tank 71 and the second catch tank 72.

As described later, the first catch tank 71 includes an upper oil guide passage 73 for receiving oil splashed by the differential input gear 51 and dropping, and guiding oil into the first catch tank 71 in the width direction H (refer to FIGS. 3 to 5). The upper oil guide passage 73 protrudes in the axial direction L (first axial direction L1) from the wall surface (first wall surface 11a) of the case 10 (case body 11) extending in the vertical direction Z. The upper oil guide passage 73 includes a specific oil guide 77 at a position in the axial direction L from the differential input gear 51. The differential input gear 51 is a helical gear. The differential input gear 51 has a tooth surface inclined to guide, in response to the differential input gear 51 rotating in either direction (in the first rotation direction V1 shown in FIG. 7), oil splashed by the differential input gear 51 to the specific oil guide 77.

As described above, the upper oil guide passage 73 includes the specific oil guide 77. As shown in FIGS. 3 to 5, the specific oil guide 77 protrudes in the first axial direction L1 from the first wall surface 11a of the case body 11. As shown in FIG. 6, the specific oil guide 77 is not located on the second wall surface 12a of the first cover 12. In this structure, the specific oil guide 77 is located without overlapping the first counter gear 41 when viewed vertically.

In place of the specific oil guide 77, the first cover 12 includes, as shown in FIG. 6, a circumferential oil guide passage 61 for receiving oil dispersed in the circumferential direction of the first counter gear 41 and guiding oil into the first catch tank 71 and the second catch tank 72. The circumferential oil guide passage 61 protrudes in the axial direction L (second axial direction L2) from the wall surface (second wall surface 12a) of the case 10 (first cover 12) extending in the vertical direction Z, and also extends along an outer circumference of the first counter gear 41 from a lower position Z2 than the first counter gear 41 to a higher position Z1 than the first counter gear 41. As described above, the specific oil guide 77 is located without overlapping the first counter gear 41 when viewed vertically. The circumferential oil guide passage 61 extends without interfering with the specific oil guide 77. In the illustrated example, the circumferential oil guide passage 61 has, in its portion facing a surface of the first counter gear 41 facing a lower position Z2, an arc shape parallel to an outer circumferential surface of the first counter gear 41 when viewed in the axial direction L. The circumferential oil guide passage 61 with the arc shape is gradually spaced from the outer circumferential surface of the first counter gear 41 and has a radius of curvature gradually increasing toward a higher position Z1 from a position corresponding to the position of the third axis A3 in the vertical direction Z.

Figure 8:
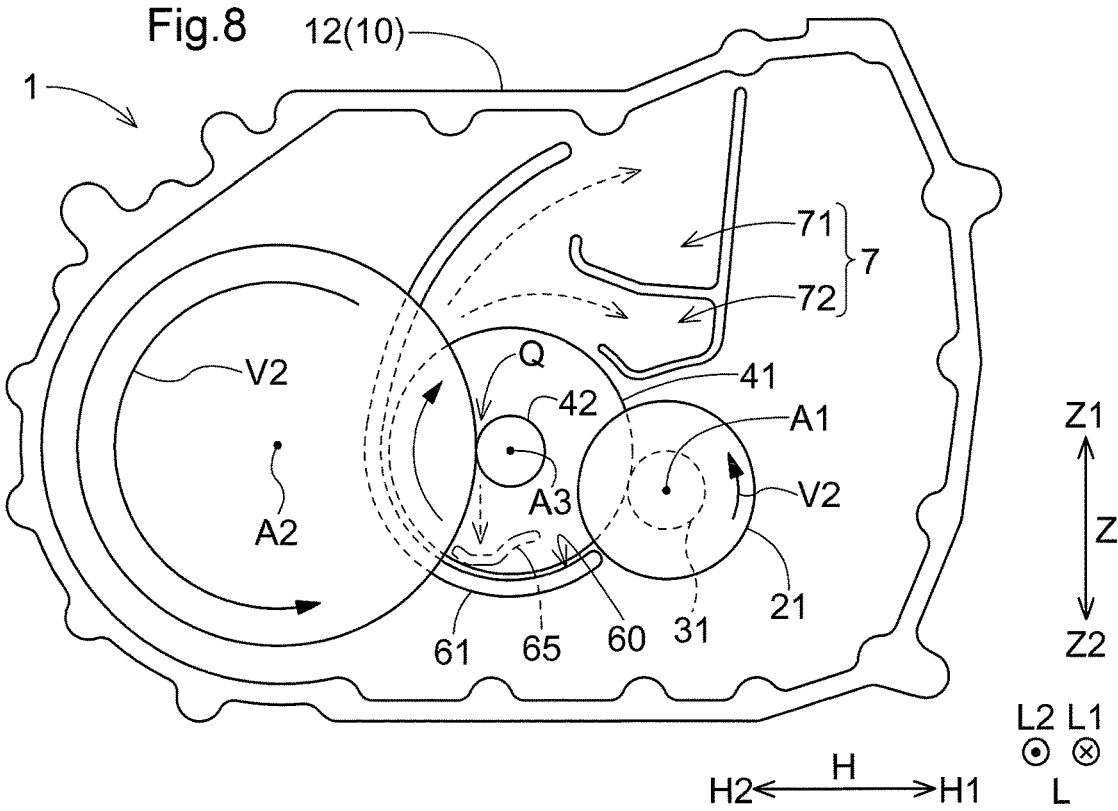
FIG. 8 is a diagram showing a passage for guiding oil into the catch tank when the vehicle drive device (the rotor and the differential input gear) rotates in a second rotation direction.

As described in detail later, oil splashed mainly through rotation of the first counter gear 41 is supplied to the first catch tank 71 and the second catch tank 72 using the circumferential oil guide passage 61, as shown in FIGS. 6 and 8. Thus, an oil receiver 60 is at a lower position Z2 than the first counter gear 41 in the circumferential oil guide passage 61. Oil is stored in the oil receiver 60 to allow the tooth surface on a lower position Z2 of the first counter gear 41 to be immersed. Oil is thus splashed by the first counter gear 41, guided through the circumferential oil guide passage 61, and supplied to the first catch tank 71 and the second catch tank 72. As shown in FIGS. 4 to 6 and 8, an axial oil guide passage 65 extends in the axial direction L to supply oil efficiently to the oil receiver 60. As shown in FIGS. 5, 6, and 8, the axial oil guide passage 65 receives oil splashed by the differential input gear 51 and dropping from a meshing portion Q between the differential input gear 51 and the second counter gear 42. The received oil is then guided into the oil receiver 60 to supply the oil to the tooth surface of the first counter gear 41 from a position in the first axial direction L1 to a position in the second axial direction L2 along the axis in the axial direction L.

The vehicle drive device 1 according to the present embodiment may include the catch tank 7 that stores oil splashed by the first counter gear 41 and supplies oil to the target space F including the target portion G to which the oil is supplied. As described above, the vehicle drive device 1 also includes the axial oil guide passage 65 for receiving oil splashed by the differential input gear 51 and dropping from the meshing portion Q between the differential input gear 51 and the second counter gear 42, and guiding oil in the axial direction L to the tooth surface of the first counter gear 41.

As described above, the vehicle drive device 1 according to the present embodiment includes the oil receiver 60 that temporarily stores oil supplied from the axial oil guide passage 65 at a lower position Z2 below the first counter gear 41. The axial oil guide passage 65 has a gutter shape protruding in the axial direction L (first axial direction L1) from the wall surface (first wall surface 11a) of the case 10 (case body 11) extending in the vertical direction Z. The axial oil guide passage 65 overlaps the meshing portion Q between the differential input gear 51 and the second counter gear 42 as well as the oil receiver 60 when viewed vertically.

The meshing portion Q and the axial oil guide passage 65 overlap when viewed vertically, thus allowing oil to be received appropriately after dropping from the meshing portion Q. The oil receiver 60 and the axial oil guide passage 65 overlap when viewed vertically, thus allowing the oil receiver 60 to appropriately receive oil flowing through the axial oil guide passage 65. Oil can thus be appropriately guided from the meshing portion Q to the oil receiver 60 through the gutter-shaped axial oil guide passage 65.

In some embodiments, with the full area in the axial direction L in the meshing portion Q overlapping the axial oil guide passage 65 when viewed vertically, dropping oil can be received efficiently. With the axial oil guide passage 65 partially overlapping the oil receiver 60 when viewed vertically to have its end overlapping the oil receiver 60 when viewed vertically, oil flowing through the axial oil guide passage 65 can be efficiently supplied to the oil receiver 60.

In the present embodiment, the axial oil guide passage 65 is a component separate from the case 10 (case body 11) and is fastened to the first wall surface 11a of the case body 11 with a fastener 69. However, the axial oil guide passage 65 may be formed integrally with the case body 11 by, for example, casting.

The first counter gear bottom 41L as the lowest portion of the first counter gear 41 is at a higher position Z1 than the oil surface at the lowest level (third oil level D3) in the oil reservoir P. Oil cannot be splashed by the first counter gear 41 when the oil surface is at the lowest level. However, as described above, the axial oil guide passage 65 and the oil receiver 60 allow oil to be splashed by the first counter gear 41 at any oil level in the oil reservoir P. The oil surface is the lowest level when, for example, the oil temperature is higher than room temperature and the rotational speed of the rotor 21 is high (the rotational speed of the gears such as the differential input gear 51 is high). When oil with lower viscosity is splashed, more oil is stored in the first catch tank 71 and the second catch tank 72, and less oil returns to the oil reservoir P.

In the present embodiment, as shown in FIG. 5, the lowest portion of the rotor 21 (rotor bottom 21L) is at a higher position Z1 than the oil surface (second oil level D2) in the oil reservoir P in a steady rotation state in which the rotor 21, the counter gear assembly 4, and the differential gear assembly 5 are rotating. With the rotor bottom 21L at the higher position Z1 than the second oil level D2, the rotor 21 has no part immersed in the oil in the steady rotation state. This reduces the fluid resistance generated in the rotor 21, and reduces a decrease in the efficiency of the rotary electric machine 2 and the efficiency of the vehicle drive device 1. With the oil surface at the highest level (first oil level D1) in the oil reservoir P, the rotor bottom 21L may be at a lower position Z2 than the first oil level D1. Such a state occurs in an early stage of rotation from when the vehicle drive device 1 stops, thus possibly causing a limited decrease in the efficiency caused by the fluid resistance. For the first oil level D1, the rotor bottom 21L can be at the lower position Z2 than the first oil level D1, thus allowing an intended amount of oil to be stored in the case 10.

In the present embodiment, the first counter gear 41 (first counter gear bottom 41L) has its lowest portion at a higher position Z1 than the lowest portion of the rotor 21 (rotor bottom 21L). In other words, the first counter gear 41 also has no part immersed in the oil in the steady rotation state in the present embodiment. This also reduces the fluid resistance generated in the counter gear assembly 4 (first counter gear 41), and reduces a decrease in the efficiency of the vehicle drive device 1.

Figure 7:
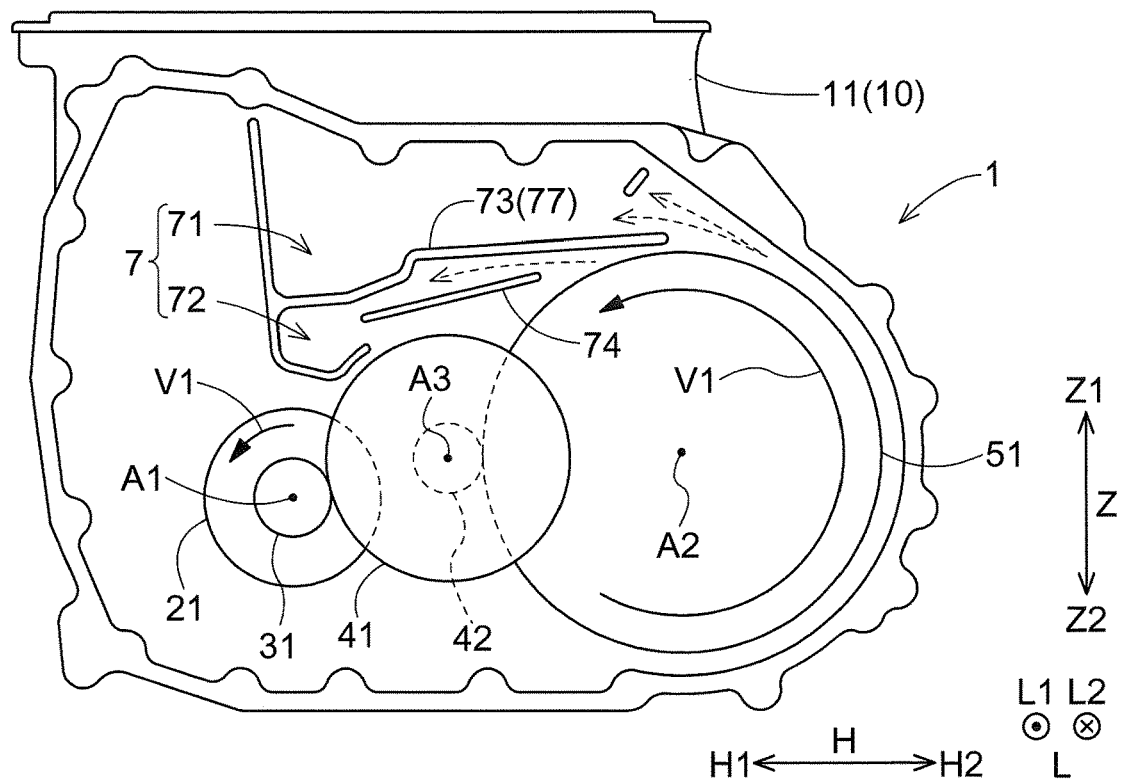
FIG. 7 is a diagram showing a passage for guiding oil into a catch tank when the vehicle drive device (a rotor and a differential input gear) rotates in a first rotation direction.

The gears and the catch tank 7 are arranged in the vehicle drive device 1 as described above. The supply of oil to the catch tank 7 will now be described. The rotation direction of the vehicle drive device 1 hereafter refers to the rotation direction of the rotor 21 and the differential input gear 51. In other words, the rotation direction of the counter gear assembly 4 is constantly reverse to the rotation direction of the vehicle drive device 1 (the rotor 21 and the differential input gear 51). FIG. 7 shows a passage for guiding oil into the catch tank 7 when the vehicle drive device 1 rotates in the first rotation direction V1. FIG. 8 shows a passage for guiding oil into the catch tank 7 when the vehicle drive device 1 rotates in the second rotation direction V2 reverse to the first rotation direction V1. For example, when the vehicle 100 on which the vehicle drive device 1 is mounted moves forward, the vehicle drive device 1 rotates in the first rotation direction V1. When the vehicle 100 moves backward, the vehicle drive device 1 rotates in the second rotation direction V2.

As shown in FIG. 5, the differential input gear 51 has a part immersed in the stored oil at the lowest third oil level D3 in the oil reservoir P. Independent of the amount of oil stored in the oil reservoir P, oil can be splashed through rotation of the differential input gear 51. When the vehicle drive device 1 or the differential input gear 51 rotates in the first rotation direction V1 as shown in FIG. 7, oil splashed by the differential input gear 51 is supplied to the first catch tank 71 and the second catch tank 72 with a centrifugal force. As described above with reference to FIG. 3, the differential input gear 51 is a helical gear. In the present embodiment, when the differential input gear 51 rotates in the first rotation direction V1, the orientation of the helical teeth of the differential input gear 51 is set in the direction perpendicular to the helical teeth facing in the rotation direction facing the catch tank 7 with respect to the differential input gear 51 in the axial direction L. Oil splashed by the differential input gear 51 rotating in the first rotation direction V1 is deflected toward the catch tank 7 (deflected in the second axial direction L2) and dispersed, thus being efficiently guided into the catch tank 7.

As described above, the first catch tank 71 includes the upper oil guide passage 73 (specific oil guide 77) for receiving oil splashed by the differential input gear 51 and dropping, and guiding oil into the first catch tank 71 in the width direction H. As shown in FIGS. 3 to 5 and 7, the specific oil guide 77 extends to a higher position Z1 than the differential input gear 51 to overlap the differential input gear 51 when viewed vertically, and can thus appropriately receive oil splashed by the differential input gear 51 and can guide the oil into the first catch tank 71.

The upper oil guide passage 73 (specific oil guide 77) allows oil splashed by the differential input gear 51 to be appropriately guided into the first catch tank 71. The differential input gear 51 for splashing oil includes the helical gear. The inclination direction is the direction in which oil splashed by the differential input gear 51 is guided to the specific oil guide 77 when the differential input gear 51 is rotating in either direction. Oil can thus be efficiently guided into the catch tank 7 (first catch tank 71) at least when the differential input gear 51 is rotating in the direction.

In the present embodiment, as shown in FIGS. 3 to 5, a lower oil guide passage 74 also receives oil splashed by the differential input gear 51 and guides the oil into the second catch tank 72 in the width direction H. The lower oil guide passage 74 also protrudes in the axial direction L (first axial direction L1) from the first wall surface 11a of the case 10 (case body 11). The lower oil guide passage 74 also extends to overlap the differential input gear 51 when viewed vertically, and can thus appropriately receive oil splashed by the differential input gear 51 and guide the oil into the second catch tank 72. Similarly to the upper oil guide passage 73 (specific oil guide 77), the lower oil guide passage 74 is also located to guide splashed oil to the lower oil guide passage 74 in response to the differential input gear 51 including the helical gear rotating in the first rotation direction V1. Oil can thus be efficiently guided into the catch tank 7 (second catch tank 72) at least when the differential input gear 51 is rotating in the direction.

As described above, when the vehicle drive device 1 rotates in the first rotation direction V1, oil can be appropriately guided into the first catch tank 71 and the second catch tank 72 after being splashed by the differential input gear 51 immersed in the oil reservoir P. When the vehicle drive device 1 rotates in the second rotation direction V2, the differential input gear 51 rotates in the reverse direction, and the splashed oil is dispersed also in the reverse direction, thus greatly reducing oil droplets reaching the upper oil guide passage 73 and the lower oil guide passage 74. This also reduces oil guided into the catch tank 7. The gears in the counter gear assembly 4 rotate in the direction reverse to the rotation direction of differential input gear 51. When the vehicle drive device 1 (differential input gear 51) rotates in the second rotation direction V2, the first counter gear 41 rotates in the first rotation direction V1. When the vehicle drive device 1 rotates in the second rotation direction V2, oil splashed by the first counter gear 41 is guided into the catch tank 7.

In other words, as described above with reference to FIGS. 6 and 8, oil splashed by the rotation of the first counter gear 41 is guided into the first catch tank 71 and the second catch tank 72 using the circumferential oil guide passage 61. More specifically, the axial oil guide passage 65 receives oil dropping from the meshing portion Q between the differential input gear 51, which splashes the oil from the oil reservoir P, and the second counter gear 42, which meshes with the differential input gear 51. The axial oil guide passage 65 extending from a position in the second axial direction L2 to a position in the first axial direction L1 guides oil dropping from the meshing portion Q into the oil receiver 60 at a lower position Z2 than the first counter gear 41. The first counter gear 41 rotating in the first rotation direction V1 then splashes oil stored in the oil receiver 60. Oil droplets dispersed in the radial direction of the first counter gear 41 with a centrifugal force are guided into the first catch tank 71 and the second catch tank 72 through the circumferential oil guide passage 61.

The axial oil guide passage 65 can receive oil dropping from the meshing portion Q between the differential input gear 51, which splashes oil from the oil reservoir P, and the second counter gear 42, which meshes with the differential input gear 51, and can guide the oil to the tooth surface of the first counter gear 41. This allows the first counter gear 41 to splash and supply oil to the catch tank 7 when the first counter gear 41 has no part immersed in the oil stored in the oil reservoir P.

The circumferential oil guide passage 61 to receive oil dispersed through rotation of the first counter gear 41 rotating in the direction reverse to the rotation direction of the differential input gear 51 and guide the oil to the first catch tank 71 and the second catch tank 72 allows the oil to be efficiently supplied to the catch tank 7 through rotation of the first counter gear 41 when the rotation direction of the differential input gear 51 is reverse to the rotation direction in which the oil can be efficiently supplied to the catch tank 7.

As described above, the specific oil guide 77 is located without overlapping the first counter gear 41 when viewed vertically. When the rotation direction of the differential input gear 51 is reverse to the rotation direction that can efficiently supply oil to the catch tank 7, the first counter gear 41 rotating in the direction reverse to the rotation direction of the differential input gear 51 may splash and supply oil to the catch tank 7. In this case, the specific oil guide 77 overlapping the first counter gear 41 when viewed vertically may obstruct the oil passage from the first counter gear 41 to the catch tank 7. The specific oil guide 77 is located without overlapping the first counter gear 41 when viewed vertically, thus allowing oil to be efficiently supplied to the catch tank 7 through rotation of the first counter gear 41.

In the present embodiment, the first catch tank 71 has a larger capacity than the second catch tank 72. For example, when the first rotation direction V1 is the rotation direction for the vehicle 100 moving forward, the first rotation direction V1 is the most frequent rotation direction. As shown in, for example, FIG. 7, most of the oil splashed by the differential input gear 51 is to be guided into the first catch tank 71. For the first catch tank 71 with a large capacity, less oil returns to the oil reservoir P, lowering the oil level in the oil reservoir P. This reduces the fluid resistance of the differential input gear 51, and reduces a decrease in the efficiency of the vehicle drive device 1.

The first catch tank 71 is at a higher position Z1 than the second catch tank 72, thus having more target spaces F at a lower position Z2 than the second catch tank 72. In other words, the first catch tank 71 has more target spaces F that can supply oil from the first catch tank 71 under gravity than the second catch tank 72. Oil stored in the first catch tank 71 can also be supplied to the second catch tank 72 under gravity. Oil can thus be supplied to the target space F continuous with the second catch tank 72 when a smaller amount of oil is guided into the second catch tank 72. In this manner, when the first catch tank 71 has a larger capacity than the second catch tank 72, oil can be more easily supplied to the target space F.

As described above, the catch tank 7 in the present embodiment includes the two tanks, or the first catch tank 71 and the second catch tank 72, which can efficiently store oil supplied through different passages. As described above with reference to FIGS. 7 and 8, when the gear for splashing oil rotates in the reverse direction, the gear splashes oil on a different passage. At least one of the two tanks, or the first catch tank 71 or the second catch tank 72, can store oil efficiently independent of the rotation direction of the gear.

The second catch tank 72 is located lower than the first counter gear upper end 41H, which is the upper end of the first counter gear 41, as described above with reference to FIG. 8. Oil can thus be appropriately guided into the second catch tank 72 by the first counter gear 41 splashing the oil.

As described above with reference to FIGS. 7 and 8, the vehicle drive device 1 according to the present embodiment can appropriately guide oil into the catch tank 7 independent of the rotation direction of the vehicle drive device 1 and can supply oil from the catch tank 7 to the target space F. In other words, whether the vehicle 100 moves forward or backward, oil can be appropriately guided into the catch tank 7, allowing the oil to be supplied from the catch tank 7 to the target space F.

Figure 9:
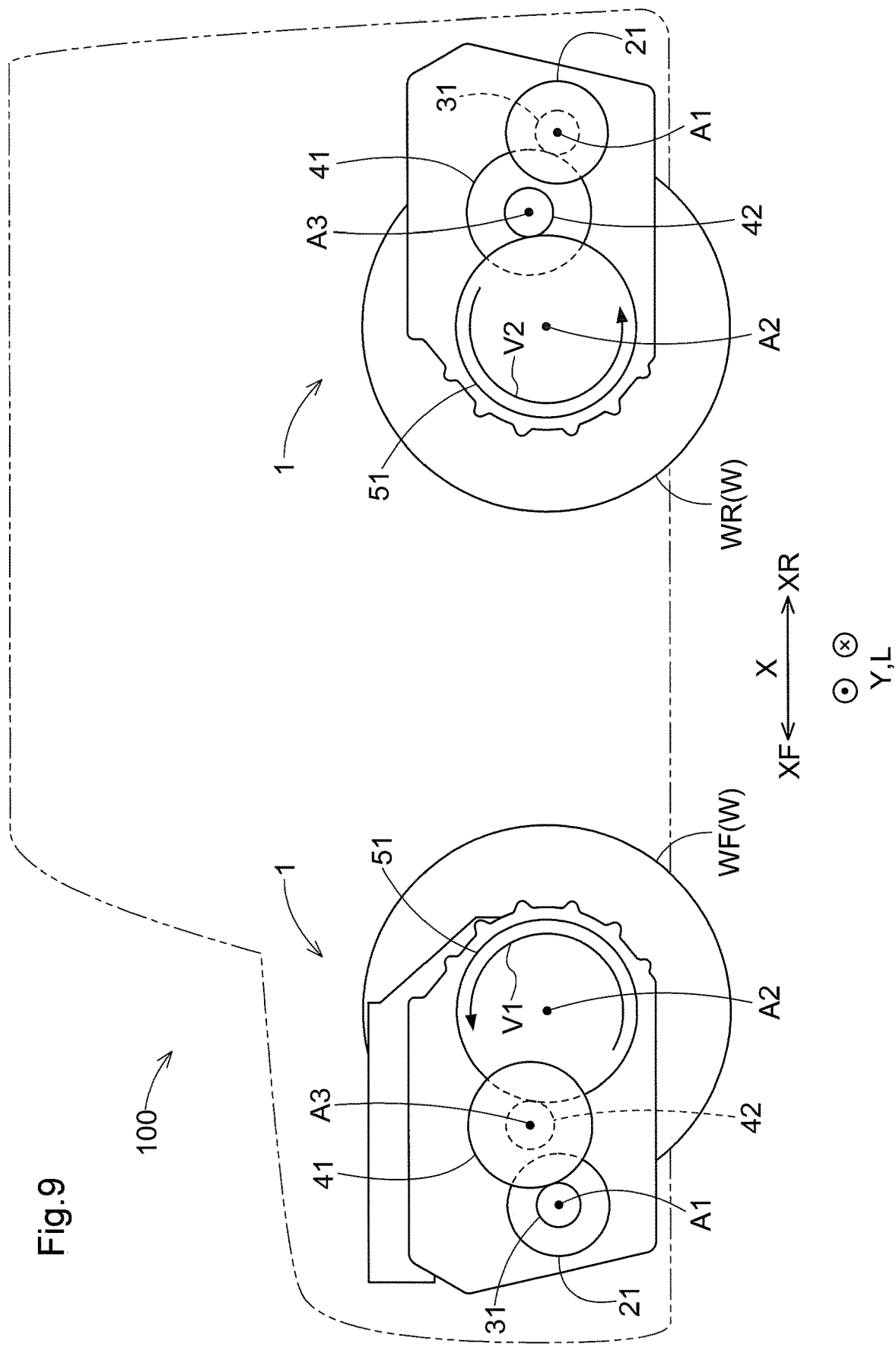
FIG. 9 is a schematic side view of an example vehicle incorporating the vehicle drive devices mounted respectively for front wheels and for rear wheels.

The vehicle drive device 1 with the same structure according to the present embodiment can be used for the front wheels and for the rear wheels in a four-wheel drive vehicle 100 at a lower cost. For example, as shown in FIGS. 9 and 10, vehicle drive devices 1 with the structure according to the present embodiment can be used for driving the front wheels WF and for driving the rear wheels WR in the four-wheel drive vehicle 100. In this case, as shown in FIGS. 9 and 10, the vehicle drive devices 1 can be mounted on the vehicle 100 with the axes (the first axis A1, the second axis A2, and the third axis A3) having reverse positional relationship in the vehicle front-rear direction X. In this case, one of the vehicle drive device 1 for driving the front wheels WF and the vehicle drive device 1 for driving the rear wheels WR rotates in the first rotation direction V1, and the other vehicle drive device 1 rotates in the second rotation direction. The vehicle drive device 1 according to the present embodiment can appropriately guide oil into the catch tank 7 and can supply oil from the catch tank 7 to the target space F when the vehicle drive device 1 is rotating in either the first rotation direction V1 or the second rotation direction V2.

For example, in the vehicle drive device 1 for driving the front wheels WF, the first axis A1 may be in the front direction XF from the second axis A2, and in the vehicle drive device 1 for driving the rear wheels WR, the first axis may be in the rear direction XR from the second axis. With the vehicle drive devices 1 mounted in this manner, a space can be easily left between the axles of the front wheels WF and the rear wheels WR. The space can easily receive a component, such as an electric storage device, and is usable for a cabin. When the rotary electric machine 2 is in the front direction XF from the second axis A2, the rear seat may have an insufficient legroom. However, in the vehicle drive device 1 for driving the rear wheels WR, the rotary electric machine 2 may be in the front direction XF from the second axis A2. The vehicle with this structure can easily have a sufficient legroom in the rear seat for passenger comfort.

The vehicle drive device 1 with the same structure can have at least the case 10 cast with the same mold, and can have the same relationship between the first axis A1, the second axis A2, and the third axis A3. The structure may not have specific portions with precisely the same structure. For the rotary electric machine 2, for example, the number of stacked electromagnetic steel plates in the rotor core 22 and the stator core 24 or the number of turns of the stator coil 25 may differ between the two vehicle drive devices 1. When intended torque for driving the front wheels WF differs from intended torque for driving the rear wheels WR, the specifications of the rotary electric machine 2 as a drive source for the wheels W may be changed as appropriate.

As described above, the vehicle drive device 1 according to the present embodiment can supply lubricant oil to an object for lubrication located in the case 10 by splashing oil through rotation of gears with less loss in the gear assembly caused by the viscous resistance of the oil.

Other Embodiments

Other embodiments will now be described. The structures described in the embodiments below may not be implemented separately but may be combined with those in other embodiments unless any contradiction arises.

(1) In the above embodiment, the vehicle drive device 1 has three axes, or the first axis A1, the second axis A2, and the third axis A3. In some embodiments, the vehicle drive device 1 may have two, four, or more axes.

(2) In the above embodiment, the first catch tank 71 has a larger capacity than the second catch tank 72. In some embodiments, the first catch tank 71 may have substantially the same capacity as the second catch tank 72, or the second catch tank 72 may have a larger capacity than the first catch tank 71.

(3) In the above embodiment, the rotor bottom 21L is at a higher position Z1 than the second oil level D2 in the steady rotation state. In some embodiments, the structure may include the rotor bottom 21L at a higher position Z1 than the second oil level D2 in the steady rotation state, although this structure can increase the fluid resistance.

(4) In the above embodiment, the rotor bottom 21L is at a higher position Z1 than the second oil level D2 in the steady rotation state, and the first counter gear bottom 41L is at a higher position Z1 than the rotor bottom 21L. In some embodiments, this structure may include the first counter gear bottom 41L at a lower position Z2 than the rotor bottom 21L. For example, in response to the first counter gear bottom 41L at a lower position Z2 than the rotor bottom 21L, the first counter gear 41 at a higher position Z1 than the second oil level D2 may have no part immersed in the oil in the steady rotation state, thus reducing the fluid resistance.

(5) In the above embodiment, the first catch tank 71 is continuous with the second catch tank 72 through the orifice 8. In some embodiments, the first catch tank 71 and the second catch tank 72 may be separate from each other without being continuous with each other.

(6) In the above embodiment, the differential input gear 51 is a helical gear. In some embodiments, the differential input gear 51 may be a spur gear. In the above embodiment, when the differential input gear 51 is a helical gear, the helical gear has the tooth surface inclined to guide, in response to the differential input gear 51 rotating in either direction, oil splashed by the differential input gear 51 to the specific oil guide 77. In some embodiments, when the oil disperse direction is deflected, oil can be dispersed depending on the rotation direction. This structure may include the helical gear with the tooth surface inclined to guide oil splashed by the differential input gear 51 to move away from the specific oil guide 77.

(7) In the above embodiment, the specific oil guide 77 is located without overlapping the first counter gear 41 when viewed vertically. In some embodiments, this structure may include the specific oil guide 77 and the first counter gear 41 partially overlapping, for example, when viewed vertically.

(8) In the above embodiment, the structure includes the circumferential oil guide passage 61. In some embodiments, when the oil can be guided into the first catch tank 71 and the second catch tank 72 under a centrifugal force caused by the rotation of the first counter gear 41, the circumferential oil guide passage 61 may be eliminated.

(9) In the above embodiment, the first counter gear bottom 41L, which is the lowest portion of the first counter gear 41, is at the higher position Z1 than the third oil level D3. In some embodiments, this structure may include the first counter gear bottom 41L at a lower position Z2 than the third oil level D3.

(10) In the above embodiment, the case 10 in the vehicle drive device 1 accommodates the oil pump OP. In some embodiments, the oil pump OP may be located outside the case 10 to supply oil to the vehicle drive device 1 from outside the case 10. When the oil pump OP is accommodated in the case 10, the oil pump OP in the above embodiment is at a lower position Z2 than the counter gear assembly 4 and at least partially overlaps the counter gear assembly 4 when viewed vertically. In some embodiments, the oil pump OP may be at a position different from the position in the above example.

(11) In the above embodiment, the oil receiver 60 for temporarily storing oil supplied from the axial oil guide passage 65 is located below the first counter gear 41. In some embodiments, when, for example, the axial oil guide passage 65 extends to a lower position Z2 than the first counter gear 41 and oil can be supplied to the tooth surface of the first counter gear 41, the oil receiver 60 may not be provided separately.

(12) In the above embodiment, the second catch tank 72 is lower than the end of the first counter gear 41 at a higher position Z1 in the vertical direction Z. In some embodiments, when oil is sufficiently dispersed under a centrifugal force caused by rotation of the first counter gear 41, the second catch tank 72 may be located higher than the end of the first counter gear 41 at the higher position Z1 in the vertical direction Z.

(13) In the above embodiment, the catch tank 7 includes the two tanks, or the first catch tank 71 and the second catch tank 72. In some embodiments, the catch tank 7 may include a single tank.

(14) In the above embodiment, the structure includes the catch tank 7 that stores oil splashed by the gear and supplies the oil to the target space F including the target portion G to which the oil is supplied. In some embodiments, splashed oil may not be stored and may be applied to the target portion G. In other words, the catch tank 7 may be eliminated.

Overview of Embodiments

The vehicle drive device (1) described above will be overviewed briefly below.

In one aspect, a vehicle drive device (1) includes a rotary electric machine (2) including a rotor (21), a differential gear assembly (5) that distributes a driving force transmitted to a differential input gear (51) to a pair of wheels (W), a counter gear assembly (4) that transmits the driving force between the rotor (21) and the differential input gear (51), and a case (10) accommodating the rotary electric machine (2), the differential gear assembly (5), and the counter gear assembly (4). The rotor (21) is located on a first axis (A1). A rotor output gear (31) rotatable integrally with the rotor (21) is located on the first axis (A1). The differential gear assembly (5) is located on a second axis (A2) parallel to and different from the first axis (A1). The counter gear assembly (4) is located on a third axis (A3) parallel to and different from the first axis (A1) and the second axis (A2) and includes a first counter gear (41) meshing with the rotor output gear (31) and a second counter gear (42) rotatable integrally with the first counter gear (41) and meshing with the differential input gear (51). The vehicle drive device (1) further includes an axial oil guide passage (65) that receives oil splashed by the differential input gear (51) and dropping from a meshing portion between the differential input gear (51) and the second counter gear (42) and guides the oil in an axial direction (L) along the third axis (A3) to a tooth surface of the first counter gear (41).

In this structure, the axial oil guide passage (65) can receive oil dropping from the meshing portion between the differential input gear (51), which splashes oil, and the second counter gear (42), which meshes with the differential input gear (51), and can guide the oil to the tooth surface of the first counter gear (41). This allows the first counter gear (41) to splash oil when the first counter gear (41) has no part immersed in the oil. Thus, the vehicle drive device (1) with this structure can supply lubricant oil to an object for lubrication by splashing oil through rotation of gears with less loss in the gear assembly caused by the viscous resistance of the oil.

In the vehicle drive device (1), the case (10) may include an oil reservoir (P) located in a lower portion of the case (10) to store oil. The first counter gear (41) may include a lowest portion (41L) located at a higher position (Z1) than an oil surface (D3) at a lowest level in the oil reservoir (P).

The oil cannot be splashed by the first counter gear (41) when the oil surface is at the lowest level. However, the axial oil guide passage (65) and the oil receiver (60) allow oil to be splashed by the first counter gear (41) at any oil level in the oil reservoir (P).

In the vehicle drive device (1), the axial oil guide passage (65) may have a gutter shape protruding in the axial direction (L) from a wall surface of the case (10) extending in a vertical direction (Z). The axial oil guide passage (65) may overlap the meshing portion (Q) between the differential input gear (51) and the second counter gear (42) when viewed vertically.

In this structure, the meshing portion (Q) and the axial oil guide passage (65) overlap when viewed vertically, thus allowing oil to be received appropriately after dropping from the meshing portion (Q).

The vehicle drive device (1) may further include an oil receiver (60) located below the first counter gear (41) to temporarily store oil supplied from the axial oil guide passage (65). The axial oil guide passage (65) may overlap the oil receiver (60) when viewed vertically.

The oil receiver (60) and the axial oil guide passage (65) overlap when viewed vertically, thus allowing the oil receiver (60) to appropriately receive oil flowing through the axial oil guide passage (65).

In the vehicle drive device (1), the case (10) may include the oil reservoir (P) located in the lower portion of the case (10) to store oil. The rotor (21) may include a lowest portion (21L) located at a higher position (Z1) than an oil surface (D2) in the oil reservoir (P) in a steady rotation state in which the rotor (21), the counter gear assembly (4), and the differential gear assembly (5) rotate.

When the rotor bottom (21L) is at a higher position (Z1) than the oil surface (D2) in the oil reservoir (P) in the steady rotation state, the rotor (21) includes no part immersed in the oil in the steady rotation state. This reduces the fluid resistance generated in the rotor (21), and reduces a decrease in the efficiency of the rotary electric machine (2) and the efficiency of the vehicle drive device (1).

In the vehicle drive device (1), the first counter gear (41) may include a lowest portion (41L) at a higher position (Z1) than the lowest portion (21L) of the rotor (21).

As described above, the rotor (21) has no part immersed in the oil in the steady rotation state. In this structure, the first counter gear (41) also has no part immersed in the oil in the steady rotation state. This also reduces the fluid resistance generated in the counter gear assembly (4), or specifically in the first counter gear (41), and reduces a decrease in the efficiency of the vehicle drive device (1).

In the vehicle drive device (1), the case (10) may include the oil reservoir (P) located in the lower portion of the case (10) to store oil. The vehicle drive device (1) may further include an oil pump (OP) that sucks and discharges the oil stored in the oil reservoir (P) to supply the oil to at least the rotary electric machine (2). The oil pump (OP) may be at a lower position (Z2) than the counter gear assembly (4) and at least partially overlap the counter gear assembly (4) when viewed vertically.

The counter gear assembly (4), which drives and connects the rotor (21) in the rotary electric machine (2) and the differential input gear (51), can be arranged with higher degrees of freedom than the rotor (21) and the differential input gear (51), which are arranged based on the positions of the rotary electric machine (2) and the wheels (W). The counter gear assembly (4) can thus more easily have a space at the lower position (Z2) for the oil pump (OP) for efficient use of the space in the case (10). The oil is stored in the lower portion of the case (10) under gravity. The oil pump (OP) at a lower position in the case (10) can easily pump oil that accumulates in a lower portion of the case (10) under gravity. In particular, when the counter gear assembly (4) is not used to splash oil stored in the oil reservoir (P), the gear in the counter gear assembly (4) has no part to be immersed in the oil reservoir (P), thus allowing the counter gear assembly (4) to be located at a relatively higher position in the case (10). This structure can thus easily have a space for accommodating the oil pump (OP) below the case (10) having the oil reservoir (P), or for example, below the counter gear assembly (4).

The vehicle drive device (1) may further include a catch tank (7) that stores oil splashed by the first counter gear (41) and supplies oil to a target space (F) including a target portion (G) to which the oil is supplied.

This structure allows the first counter gear (41) to splash and supply oil to the catch tank (7) when the first counter gear (41) has no part immersed in the oil, thus allowing oil to be supplied appropriately to the target space (F).

REFERENCE SIGNS LIST

1: vehicle drive device, 2: rotary electric machine, 4: counter gear assembly, 5: differential gear assembly, 7: catch tank, 10: case, 11a: first wall surface (wall surface extending in vertical direction of case), 21: rotor, 21L: rotor bottom (lowest portion of rotor), 31: rotor output gear, 41: first counter gear, 41L: first counter gear bottom (lowest portion of first counter gear), 42: second counter gear, 51: differential input gear, 60: oil receiver, 65: axial oil guide passage, A1: first axis, A2: second axis, A3: third axis, D2: second oil level (oil surface in oil reservoir in steady rotation state), D3: third oil level (oil surface at lowest level in oil reservoir), F: target space, G: target portion, L: axial direction, OP: oil pump, P: oil reservoir, Q: meshing portion, W: wheel, Z: vertical direction, Z1: higher position, Z2: lower position

The invention claimed is:

1. A vehicle drive device, comprising:
a rotary electric machine including a rotor;
a differential gear assembly configured to distribute a driving force transmitted to a differential input gear to a pair of wheels;
a counter gear assembly configured to transmit the driving force between the rotor and the differential input gear;
a case accommodating the rotary electric machine, the differential gear assembly, and the counter gear assembly, wherein:
the rotor is located on a first axis,
a rotor output gear rotatable integrally with the rotor is located on the first axis,
the differential gear assembly is located on a second axis parallel to and different from the first axis, and
the counter gear assembly is located on a third axis parallel to and different from the first axis and the second axis and includes a first counter gear meshing with the rotor output gear and a second counter gear rotatable integrally with the first counter gear and meshing with the differential input gear;
a first catch tank configured to store oil splashed by the differential input gear in response to the rotor rotating in a first rotation direction and to store oil splashed by the first counter gear in response to the rotor rotating in a second rotation direction reverse to the first rotation direction;
a second catch tank configured to store oil splashed by the first counter gear in response to the rotor rotating in the second rotation direction, wherein the first catch tank and the second catch tank are aligned in a vertical direction and at least partially overlap each other when viewed in the vertical direction, and the second catch tank is at a lower position than the first catch tank; and
an axial oil guide passage configured to receive oil splashed by the differential input gear and dropping from a meshing portion between the differential input gear and the second counter gear and guide the oil in an axial direction along the third axis to a tooth surface of the first counter gear.

2. The vehicle drive device according to claim 1, wherein the case includes an oil reservoir located in a lower portion of the case to store oil, and
the first counter gear includes a lowest portion located at a higher position than an oil surface at a lowest level in the oil reservoir.

3. The vehicle drive device according to claim 2, wherein the rotor includes a lowest portion located at a higher position than an oil surface in the oil reservoir in a steady rotation state in which the rotor, the counter gear assembly, and the differential gear assembly rotate.

4. The vehicle drive device according to claim 3, wherein the first counter gear includes a lowest portion at a higher position than the lowest portion of the rotor.

5. The vehicle drive device according to claim 2, further comprising:
an oil pump configured to suck and discharge the oil stored in the oil reservoir to supply the oil to at least the rotary electric machine, and
the oil pump is at a lower position than the counter gear assembly and at least partially overlaps the counter gear assembly when viewed vertically.

6. The vehicle drive device according to claim 1, wherein the axial oil guide passage has a gutter shape protruding in the axial direction from a wall surface of the case extending in a vertical direction, and the axial oil guide passage overlaps the meshing portion between the differential input gear and the second counter gear when viewed vertically.

7. The vehicle drive device according to claim 1, further comprising:
an oil receiver located below the first counter gear to temporarily store oil supplied from the axial oil guide passage,
wherein the axial oil guide passage overlaps the oil receiver when viewed vertically.

8. The vehicle drive device according to claim 1, further comprising:
a catch tank comprising the first catch tank and the second catch tank configured to store oil splashed by the first counter gear and supply oil to a target space including a target portion to which the oil is supplied.

9. A vehicle drive device, comprising:
a rotary electric machine including a rotor;
a differential gear assembly configured to distribute a driving force transmitted to a differential input gear to a pair of wheels;
a counter gear assembly configured to transmit the driving force between the rotor and the differential input gear;

a case accommodating the rotary electric machine, the differential gear assembly, and the counter gear assembly, wherein:
- the rotor is located on a first axis,
- a rotor output gear rotatable integrally with the rotor is located on the first axis,
- the differential gear assembly is located on a second axis parallel to and different from the first axis, and
- the counter gear assembly is located on a third axis parallel to and different from the first axis and the second axis and includes a first counter gear meshing with the rotor output gear and a second counter gear rotatable integrally with the first counter gear and meshing with the differential input gear;

a first catch tank configured to store oil splashed by the differential input gear in response to the rotor rotating in a first rotation direction and to store oil splashed by the first counter gear in response to the rotor rotating in a second rotation direction reverse to the first rotation direction;

a second catch tank configured to store oil splashed by the first counter gear in response to the rotor rotating in the second rotation direction, wherein the second catch tank is at a lower position than the first catch tank; and an axial oil guide passage configured to receive oil splashed by the differential input gear and dropping from a meshing portion between the differential input gear and the second counter gear and guide the oil in an axial direction along the third axis to a tooth surface of the first counter gear.

* * * * *